United States Patent [19]
Masterson et al.

[11] Patent Number: 4,479,997
[45] Date of Patent: Oct. 30, 1984

[54] ELECTRIC DISCHARGE FACSIMILE RECORDING MATERIAL

[75] Inventors: David C. Masterson; Warren G. Van Dorn, both of Columbus, Ohio

[73] Assignee: Exxon Research and Engineering Co., Florham Park, N.J.

[21] Appl. No.: 395,100

[22] Filed: Jul. 6, 1982

[51] Int. Cl.[3] .......................... B32B 5/16; G01D 15/24

[52] U.S. Cl. .................................. 428/212; 346/135.1; 427/121; 428/200; 428/206; 428/208; 428/211; 428/323; 428/328; 428/336; 428/337; 428/348; 428/409; 428/457; 428/484; 428/913; 428/914

[58] Field of Search ................ 427/121; 428/343, 348, 428/200, 206, 207, 208, 211, 323, 328, 336, 337, 339, 409, 457, 484, 913, 914, 212; 346/135.1

[56] References Cited

U.S. PATENT DOCUMENTS 3,373,090 3/1968 Alden .................................. 428/343
4,123,578 10/1978 Perrington et al. .................. 428/206
4,139,675 2/1979 Nagai et al. .......................... 428/344
4,163,075 7/1979 Nakano et al. ........................ 428/914
4,308,314 12/1981 Nakano et al. ....................... 428/913
4,322,469 3/1982 Nakano et al. ..................... 346/135.1
4,358,474 11/1982 Nakano et al. ....................... 428/914

*Primary Examiner*—George F. Lesmes
*Assistant Examiner*—William M. Atkinson
*Attorney, Agent, or Firm*—Stanley D. Schwartz

[57] ABSTRACT

A multilayer electric discharge recording material comprising an electrically anisotropic support layer disposed on one surface of a conductive layer and a transfer layer disposed on the other surface of the conductive layer. The transfer layer comprises a material that has a melting point between about 25° and 150° C. and that is capable of melting and adhering to a receiving medium such that a desired pattern or image can be formed and recorded on the receiving sheet.

17 Claims, 1 Drawing Figure

ELECTRIC DISCHARGE FACSIMILE RECORDING MATERIAL

BACKGROUND OF THE INVENTION

1. Field of the Invention

The present invention relates to an electric discharge recording material, and more particularly, to a reusable multilayer electrosensitive transfer film or sheet suitable for use in recording a pattern or image on a receiving sheet by means of electric discharge recording systems.

2. Description of the Prior Art

In recent years, various systems have been proposed for the rapid transmission and/or recording of information. One such system is an electric discharge recording system.

The electric discharge recording system is a process which comprises applying an electrical signal of several hundred volts and several watts in the form of an electric voltage, and breaking a semiconductive recording layer on the surface of a recording layer by electric discharge, thereby to form an image on the recording layer or on a substrate superimposed on the recording layer. This process is a "direct imaging" process which does not require processing operations such as development and fixation, and is in widespread use as a simple recording process. For example, the process finds applications in fascimile systems, various measuring instruments, recording meters, record displays in computers, and processing of electrostencil master sheets.

In the electric discharge recording, a discharge recording stylus is directly contacted with the recording surface of an electric discharge recording material. Discharging is performed through the stylus to break the recording layer, and to form an image on the recording surface.

A more recent development is disclosed by Nakano et al in U.S. Pat. No. 4,163,075 and relates to an electric discharge recording material, and more particularly, to a multilayer electrosensitive transfer sheet or film. To record with this type of film, it is laid over an untreated sheet of a receiving medium, which can be in the form of a receiving medium, such as paper, and an electric discharge stylus is moved in a regular pattern across the back of the transfer film. Provision is generally made to ground either one edge or the front surface of the transfer film. When a voltage on the order of 150 to 200 volts is applied to the stylus, current flows through the sheet and matter is caused to be transferred to the receiving sheet, e.g., paper.

The film disclosed by Nakano et al in U.S. Pat No. 4,163,075, comprises three layers, namely a film support layer and two transfer layers. The support layer is composed of a metal powder-containing resin layer, e.g., electrolytic copper powder having an average diameter of 2 microns dispersed in a vinyl chloride resin.

Numerous disadvantages appear to exist with the use of the products disclosed in the Nakano et al patent. A need therefore exists for a transfer sheet exhibiting improved image quality that can be produced at a lower cost compared to other commercially available products.

SUMMARY OF THE INVENTION

It is an object of the invention to provide an electric discharge transfer film which is free from the disadvantages described hereinabove.

Another object of the present invention is to provide an electric discharge transfer film exhibiting improved image quality.

A further object of the present invention is to provide an electric discharge transfer film that can be produced in a simple and efficient manner and at a low cost.

According to the present invention, an electric discharge recording material is provided which comprises:

(a) an electrically anisotropic support layer comprising electroconductive particles dispersed in a resin matrix;

(b) a conductive layer having first and second surfaces and having a surface resistivity of not more than $10^4$ ohms per square and a volume resistivity of not more than $10^2$ ohm-cm, wherein said support layer is disposed on the first surface of said conductive layer; and (c) a transfer layer disposed on said second surface of said conductive layer comprising a hot melt resin having a melting point between about 25° C. and 150° C. that is capable of melting and then adhering to a receiving sheet such that a desired pattern is formed on said receiving sheet.

Other objects, features and effects of this invention will become more apparent from the following detailed description considered with the drawing wherein:

FIG. 1 is an expanded sectional view of the transfer film of this invention.

DETAILED DESCRIPTION OF THE INVENTION

Figure 1:
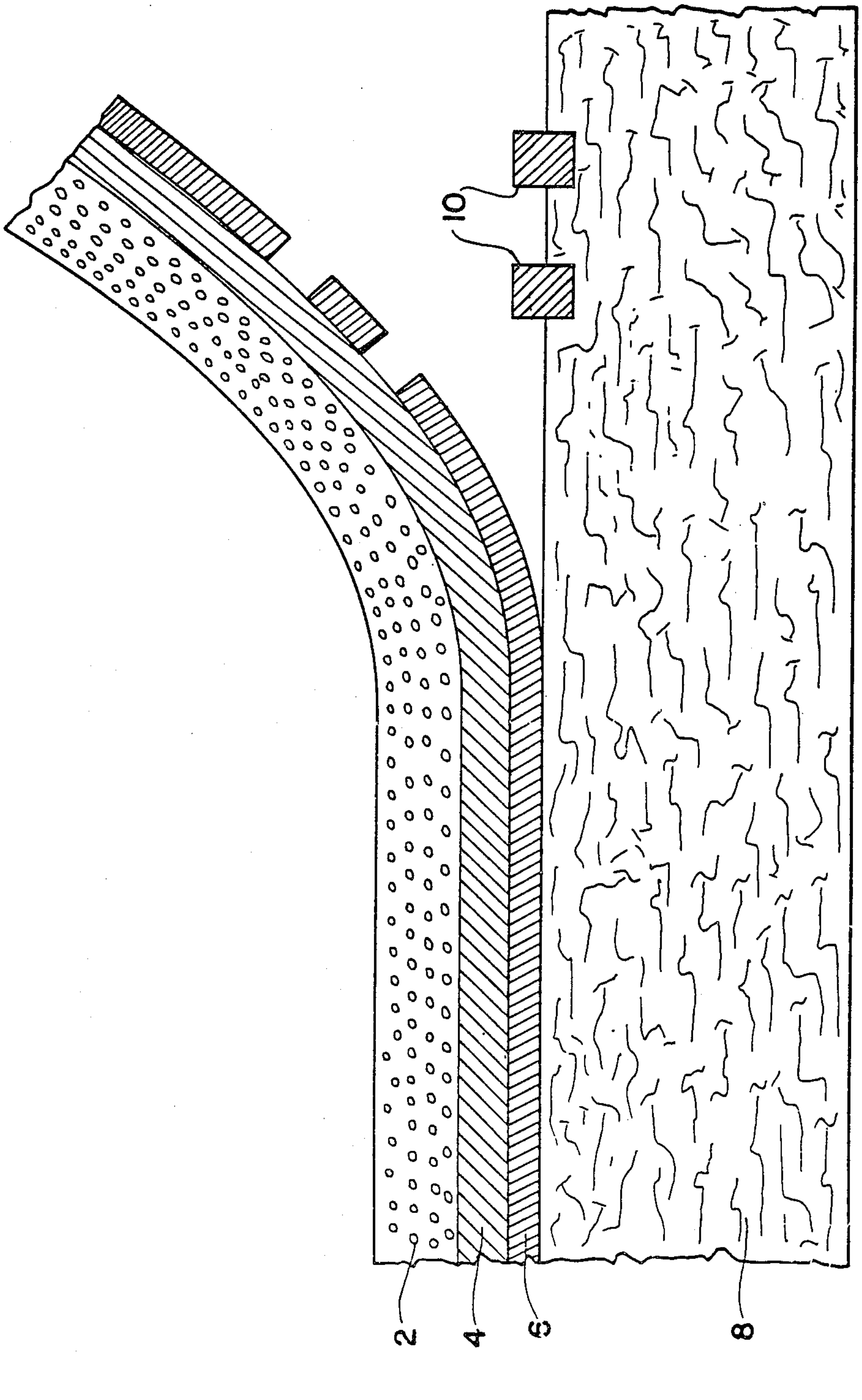

The resin which constitutes the resin matrix of layer 2 in which the electroconductive particles are dispersed may be any thermoplastic or thermosetting resin which has film-forming ability and electrical insulation (generally having a volume resistance of at least $10^7$ ohms-cm and a surface resistance generally between $10^5$ and $10^{16}$ ohms per square). Generally, the matrix resin preferably has a great ability to bind the electroconductive particles and can be formed into sheets or films having high mechanical strength, flexibility and high stiffness.

Examples of suitable resins that can be used in this layer are thermoplastic resins such as polyolefins (such as polyethylene or polypropylene), polyvinyl chloride, polyvinyl acetal, cellulose acetate, polyvinyl acetate, polystyrene, polymethyl acrylate, polymethyl methacrylate, polyacrylonitrile, thermoplastic polyesters, polyvinyl alcohol, and gelatin; and thermosetting resins such as thermosetting polyesters, epoxy resins, and melamine resins. The thermoplastic resins are preferred, and polyethylene, polyvinyl acetal, cellulose acetate, and thermoplastic polyesters are especially preferred.

As is conventional in the art, additives such as plasticizers, fillers, lubricants, stabilizers, antioxidants or mold releasing agents may be added as needed to the resin in order to improve its moldability, storage stability, plasticity, tackiness, lubricity, etc.

Examples of plasticizers are dioctyl phthalate, dibutyl phthalate, dicapryl phthalate, dioctyl adipate, diisobutyl adipate, triethylene glycol di(2-ethyl butyrate), dibutyl sebacate, dioctyl azelate, and triethylhexyl phosphate, which are generally used as plasticizers for resins. The amount of the plasticizer can be varied over a wide range according, for example, to the type of the resin and the type of the plasticizer. Generally, its amount is at most 150 parts by weight, preferably up to 100 parts by weight, per 100 parts by weight of the resin. The optimum amount of the plasticizer is not more than 80 parts by weight per 100 parts by weight of the resin.

Examples of fillers are fine powders of calcium oxide, magnesium oxide, sodium carbonate, potassium carbonate, strontium carbonate, zinc oxide, titanium oxide, barium sulfate, lithopone, basic magnesium carbonate, calcium carbonate silica, and kaolin. They may be used either alone or as mixtures of two or more.

The amount of the filler is not critical, and can be varied over a wide range according to the type of the resin, the type of the filler, etc. Generally, the amount is up to 1000 parts by weight, preferably not more than 500 parts by weight, more preferably up to 200 parts by weight, per 100 parts by weight of resin.

Usually the thickness of this layer is at least 3 microns. The upper limit of the thickness is not critical but is advantageously set at 100 microns. Preferably, the thickness is 5 to 60 microns, more preferably 10 to 40 microns.

Suitable electroconductive particles useful in layer 2 include those particles that are capable of providing the required anisotropic properties of this layer. Examples of suitable materials include metal powders such as copper, aluminum, tin, molybdenum, silver, iron, nickel and zinc, alloys of at least two metal elements, e.g., stainless steel, brass and bronze, and a copper powder coated with silver. The amount and type of metal particles useful, in layer 2 are set forth in U.S. Pat. No. 4,163,075. In addition to metal particles, graphite particles may also be dispersed throughout layer 2 in the practice of this invention.

When a graphite-containing resin is employed as layer 2, it generally contains between 5 to 65% and preferably between 15 to 45% by weight graphite based on the weight of the resin. Best results are obtained when the layer contains between 25 and 35% by weight graphite, based on the weight of the resin. The particle diameter of the graphite used in layer 2 is also critical, according to the disclosure of commonly owned copending application of Ray H. Luebbe, Jr., and entitled IMPROVED SUPPORT LAYER FOR ELECTRIC DISCHARGE TRANSFER MATERIALS Ser. No. 395,103, filed July 6, 1982, wherein the particle size is disclosed as being between 0.1 and 20 microns, and preferably between 0.1 and 5 microns, with best results being achieved with particles between 0.1 and 1 microns. Other important features regarding the dispersing of the graphite particles into the resin are hereby incorporated by reference.

Another useful electroconductive particle that may be dispersed throughout layer 2 in an amount sufficient to provide the required anisotropic properties of this layer may be carbon black which is generally present in an amount between 50 and 80% by weight carbon black based on the total weight of carbon black and binder resin. Suitable carbon blacks useful in the practice of this invention include those carbon blacks prepared in accordance with commonly owned, copending application of Ray H. Luebbe, Jr., and entitled LYOPHILIZATION PROCESS FOR PREPARING COMPOSITE PARTICLES FOR USE IN ELECTROCONDUCTIVE TRANSFER FILMS AND PRODUCTS PRODUCED THEREWITH, Ser. No. 395,584, filed July 6, 1982. Carbon blacks having a particle size between 25 and 40 millimicrons are also useful in accordance with commonly owned, copending application of Ray H. Luebbe, Jr., Frank Miro, J. David Robbins and Frank J. Palermiti entitled ELECTROSENSITIVE TRANSFER FILM, Ser. No. 395,101 filed July 6, 1982.

Layer 4 plays an important role in performing electric discharge breakdown with high accuracy by converging the current flowing through the electrically anisotropic layer 2 at a point immediately downward of the electric discharge recording stylus. Layer 4 exhibits a surface resistance generally of not more than $10^4$ ohms per square, preferably not more than $5\times10^3$ ohms per square, more preferably $10^{-1}$ to $2\times10^3$ ohms and a volume resistance generally of not more than $10^2$ ohms-cm, preferably not more than 50 ohm-cm and more preferably not more than 20 ohms-cm.

Layer 4 having such electrical resistance characteristics may be a conductive resin layer comprising a thermoplastic or thermosetting resin and a conductivity-imparting agent dispersed in it, a vacuum-deposited metal layer, or a metal foil layer.

The thermoplastic or thermosetting resin that can be used in the conductive resin layer can also be selected from those described hereinabove in connection with the non-recording support layer 2. Of these, the thermoplastic resins, especially polyethylene, cellulose acetate and polyvinyl acetal, are used advantageously. The conductivity-imparting agent to be dispersed in the resin of layer 4 may be selected from those which provide the surface resistance and volume resistance described above with respect to resin layer 4. Generally, suitable conductivity-imparting agents have a volume resistivity measured under a pressure of 50 kg/cm$^2$, of not more than $10^6$ ohms-cm. Examples of such a conductivity-imparting agent include, for example, graphites; carbon blacks; metals such as gold, silver, nickel, molybdenum, copper, aluminum, iron and conductive zinc oxide (zinc oxide doped with 0.03 to 2.0% by weight, preferably 0.05 to 1.0% by weight, based on the zinc oxide, of a different metal such as aluminum, gallium, germanium, indium, tin, antimony or iron); conductive metal-containing compounds such as cuprous iodide, stannic oxide, and metastannic acid; and zeolites. Of these, graphite, carbon blacks, silver, nickel, cuprous iodide, conductive zinc oxide are preferred, and graphite is most preferred.

Carbon blacks that may be used in layer 4 differ somewhat in conductivity according to the method of production. Generally, however, acetylene black, furnace black, channel black, and thermal black can be used.

The conductivity-imparting agent is dispersed usually in the form of a fine powder in the resin. The average particle diameter of the conductivity-imparting agent is 10 microns at most, preferably not more than 5 microns, especially preferably 2 to 0.005 microns. When a metal powder is used as the conductivity-imparting agent, it is preferably in a microspherical, dendric or microlumpy form. Since a resin layer having the metal powder dispersed therein tends to be electrically anisotropic if its particle diameter exceeds 0.2 micron, the particle size of a metal powder in the above-mentioned form to be used as a conductivity-imparting agent for the conductive resin layer 4 should be at most 0.5 micron, preferably not more than 0.2 micron, more preferably 0.15 to 0.04 micron. Scale-like or needle-like powders can also be used, but should be combined with powders of the above forms.

The amount of the conductivity-imparting agent to be added to the resin can be varied over a very wide range according to the conductivity of the conductivity-imparting agent, etc. The amount is that which is sufficient to adjust the surface resistance and volume resistance of layer 4 to the above-mentioned ranges. For example, carbon blacks are used in an amount of generally at least 10 parts by weight, preferably 20 to 200 parts by weight, more preferably 30 to 100 parts by weight; the other conductivity-imparting agents especially metal powders, are used in an amount of at least 50 parts by weight, preferably 100 to 500 parts by weight, more preferably 150 to 400 parts by weight, both per 100 parts by weight of the resin.

As needed, the conductive resin layer may contain the aforesaid additives such as plasticizers and fillers in the amounts stated.

The thickness of conductive resin layer 4 is not critical, and can be varied widely according to the uses of the final products, etc. Generally, it is at least 3 microns, preferably 3 to 50 microns, more preferably 5 to 20 microns.

The conductive layer 4 may also be in the form of a vacuum deposited metal layer according to another embodiment of the present invention. Specific examples of the metal are aluminum, zinc, copper, silver and gold. Of these, aluminum is most suitable.

The thickness of the vacuum-deposited metal layer is also not restricted. Generally, it is at least 4 millimicrons, preferably 10 to 300 millimicrons, more preferably 20 to 100 millimicrons. By an ordinary vacuum-depositing method for metal, it can be applied to one surface of the support layer 2.

The conductive layer 4 may also be a thin metal foil, for example, an aluminum foil. It can be applied to one surface of the support layer 2 by such means as bonding or plating.

The meltable material used in transfer layer 6 should have a relatively low melt viscosity, such as a viscosity in the range of 10 to 50 centipoise at 100° C., and should have a melting point in the range of 25° to 150° C., the latter corresponding to about the maximum temperature generated during the printing operation by an electric stylus to cause the localized melting of the transfer layer. The meltable material is transferred to a receiving sheet in contact with the transfer layer in a pattern that corresponds to a pattern in which the electric discharge stylus is moved across the support layer 2 of the electric discharge recording film.

Generally, the electric discharge recording films are being used for the printing of information onto paper and when paper is the recording film it is understood that the transfer layer of the transfer material must be in surface contact with the paper so that the melted areas of the transfer layer are capable of adhering to the paper.

Useful meltable materials for the practice of this invention include hard waxes. Suitable hard waxes include animal and insect waxes, mineral and petroleum waxes, vegetable waxes and synthetic waxes. Examples of suitable waxes, with their melting points are set forth in the following table:

| Waxes | Melting Point |
|---|---|
| Animal and Insect | |
| Beeswax | 62-65° C. |
| Spermaceti | 42-50° C. |
| Mineral and Petroleum | |
| Montan (German) | 83-89° C. |
| Montan (American) | 85-88° C. |

-continued

| Waxes | Melting Point |
|---|---|
| Domestic ceresine | 53.3-85° C. |
| Micro-crystalline | 60-93° C. |
| Oxidized micro-crystalline | 82.5-93° C. |
| Paraffins | 52-74° C. |
| Vegetable | |
| Bayberry | 42.-48° C. |
| Candelilla | 68.5-72.5° C. |
| Carnauba | 82.5-86° C. |
| Japan | 50-56° C. |
| Ouricury | 82.5-84° C. |
| Rice Bran | 76-82° C. |

Particularly useful synthetic waxes having the necessary melting points are oxidized synthetic waxes such as Bareco. WB-2, WB-5, WB-7, WB-10 and WB-11 may be used, WB-5 being preferred.

The meltable layer 6 may also include any color dye or pigment that is compatible with the wax so as to provide a colored image on the paper.

Coloring pigments are generally employed in layer 6, and may be in any of the well known pigments such as carbon black, iron blue, etc. Generally, the meltable layer contains an effective amount of pigment to impart the desired coloring required for this layer with the maximum amount incorporated therein being limited by cost factors and/or any adverse effect on the rheology of the layer. Generally, layer 6 contains between 10 and 22% by weight pigment based on the total weight of the layer. Amounts greater than 22% by weight will also tend to affect the flexibility of the transfer film and render the same more brittle. Amounts lower than 10% will adversely affect the image density. Conventional dyes may also be incorporated into this layer as well, provided that the dye is soluble and compatible with the hot melt. An example of a suitable dye is BASF Oil Soluble Deep Black.

The thickness of layer 6 of this invention is not critical, and can be varied widely according to the use of the recording material, and is generally on the order of about 0.1 to 0.9 mils, and preferably 0.2 mils.

The thickness of layer 4 should be as thin as possible so as to facilitate the passage of heat from layer 2 to layer 6 as quickly and directly as possible without the lateral dissipation of heat in layer 4 resulting in poor image quality. Generally the thickness of layer 4 is between 1 to 10 microns, preferably between 1 to 3 microns, with 2.5 mils being most preferred.

In the present specification, the measurements of "surface resistance" and "volume resistance" as defined herein are obtained in accordance with the teaching of H. R. Dalton in U.S. Pat. No. 2,664,044.

What is claimed is:

1. An electric discharge transfer material comprising:
(a) an electrically anisotropic support layer having electroconductive particles dispersed in a resin matrix and having a volume resistance of at least $10^7$ ohm-cm and a surface resistance between about $10^5$ and about $10^{16}$ ohms per square;
(b) a conductive layer having first and second surfaces having a surface resistance of not more than $10^4$ ohms per square and a volume resistivity of not more than $10^2$ ohm-cm, wherein said support layer is disposed on said first surface of said conductive layer; and
(c) a transfer layer disposed on said second surface of said conductive layer comprising a hot melt resin having a melting point betweeen about 25° C. and 150° C. that is capable of melting and then separating from said second surface of said conductive layer and adhering to a receiving medium such that a desired pattern is formed on said receiving medium.

2. The electric discharge transfer material of claim 1 wherein said electroconductive particles of said support layer are carbon black particles.

3. The electric discharge transfer material of claim 1 wherein said electroconductive particles of said support layer are graphite particles, said graphite particles being present in an amount and particle size sufficient to impart electrical anisotropic properties to said support layer.

4. The electric discharge transfer material of claim 3, wherein said support layer has a thickness between 3 and 100 microns.

5. The electric discharge transfer material of claim 4 wherein said support layer comprises between 5 to 65% by weight graphite particles having a particle size between 0.1 and 20 microns.

6. The electric discharge transfer material of claim 1, wherein said electroconductive particles of said support layer are metal powders.

7. The electric discharge transfer material of claim 6 wherein said metal is copper.

8. The electric discharge transfer material of claims 1, 2, 3 or 6, wherein said conductive layer comprises: (1) a thermoplastic or thermosetting resin, and (2) a particulate conductivity-imparting agent dispersed in said resin, the average particle diameter of said conductivity-imparting agent being at most 10 microns.

9. The electric discharge transfer material of claim 8, wherein said conductivity-imparting agent is graphite or carbon black particles.

10. The electric discharge transfer material of claim 9, wherein the thickness of said conductive layer is at least 3 microns.

11. The electric discharge transfer material of claim 1, wherein said conductive layer is a vacuum-deposited metal layer or a metal foil.

12. The electric discharge transfer material of claim 8, wherein said transfer layer is a hard wax.

13. The electric discharge transfer material of claim 12 wherein said hard wax is an animal wax, insect wax, mineral wax, petroleum wax, vegetable wax or synthetic wax.

14. The electric discharge transfer material of claim 13, wherein said hard wax contains from 10 to 22% by weight pigment.

15. The electric discharge transfer material of claim 14 wherein said hard wax is a synthetic wax.

16. The electric discharge transfer material of claim 14 wherein said pigment is carbon black.

17. The electric discharge transfer material of claim 13, wherein said transfer layer is about 0.1 mil in thickness.

* * * * *